United States Patent
Li et al.

(10) Patent No.: US 12,150,124 B2
(45) Date of Patent: Nov. 19, 2024

(54) RESOURCE CONFIGURATION METHOD, DEVICE, AND SYSTEM

(71) Applicant: VIVO MOBILE COMMUNICATION CO.,LTD., Guangdong (CN)

(72) Inventors: Can Li, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 292 days.

(21) Appl. No.: 17/692,442

(22) Filed: Mar. 11, 2022

(65) Prior Publication Data

US 2022/0201723 A1    Jun. 23, 2022

Related U.S. Application Data

(63) Continuation of application No. PCT/CN2020/116506, filed on Sep. 21, 2020.

(30) Foreign Application Priority Data

Sep. 25, 2019  (CN) .......................... 201910914145.5

(51) Int. Cl.
*H04W 72/1268*    (2023.01)
*H04L 5/00*    (2006.01)
(Continued)

(52) U.S. Cl.
CPC ....... *H04W 72/1268* (2013.01); *H04L 5/0048* (2013.01); *H04W 72/044* (2013.01); *H04W 72/23* (2023.01)

(58) Field of Classification Search
CPC .......... H04W 72/1268; H04W 72/044; H04W 72/23; H04W 72/04; H04W 72/0446;
(Continued)

(56) References Cited

U.S. PATENT DOCUMENTS

| 2018/0167931 A1 | 6/2018 | Papasakellariou |
| 2019/0208537 A1* | 7/2019 | Ke .......................... H04W 74/04 |

(Continued)

FOREIGN PATENT DOCUMENTS

| CN | 107770876 A | * 3/2018 | .............. H04W 4/70 |
| CN | 108989004 A | 12/2018 | |

(Continued)

OTHER PUBLICATIONS

Qualcomm Inc., "Enhancement to configured grants in NR unlicensed", 3GPP TSG RAN WG1 Meeting #98, Prague, CZ, Aug. 26-Aug. 30, 2019.

(Continued)

*Primary Examiner* — Mohamed A Kamara
(74) *Attorney, Agent, or Firm* — Price Heneveld LLP

(57) ABSTRACT

A resource configuration method, a device, and a system are disclosed. The method includes: receiving resource configuration information sent by a network device, where the resource configuration information is used to determine a plurality of candidate starting positions in time domain of a candidate resource, the candidate resource is configured by the network device for transmitting uplink information, and the uplink information includes a demodulation reference signal DMRS, where the plurality of candidate starting positions in time domain are all before a resource used to transmit the DMR.

20 Claims, 4 Drawing Sheets

(51) Int. Cl.
*H04W 72/044* (2023.01)
*H04W 72/23* (2023.01)

(58) Field of Classification Search
CPC ... H04L 5/0048; H04L 5/0044; H04L 5/0051; H04L 5/0007; H04L 5/1469
See application file for complete search history.

(56) References Cited

U.S. PATENT DOCUMENTS

| | | | |
|---|---|---|---|
| 2019/0288816 | A1 | 9/2019 | Ren et al. |
| 2021/0298045 | A1* | 9/2021 | Kim .................. H04W 72/0453 |
| 2021/0307036 | A1* | 9/2021 | Myung ............. H04W 72/1268 |
| 2024/0106611 | A1* | 3/2024 | Wang .................... H04L 5/0053 |

FOREIGN PATENT DOCUMENTS

| | | | |
|---|---|---|---|
| CN | 109274472 A | | 1/2019 |
| WO | WO-2017133368 A1 * | 8/2017 | ............ H04W 16/14 |
| WO | 2018130111 A1 | | 7/2018 |
| WO | 2018175477 A1 | | 9/2018 |
| WO | 2019014498 A1 | | 1/2019 |

OTHER PUBLICATIONS

Intel Corp., "Summary of views on the potential enhancements to configured grants", 3GPP TSG RAN WG1 Meeting #94, R1-1809825, Gothenburg, Sweden, Aug. 20-24, 2018.
Intel Corporation, "Enhancements to configured grants for NR-unlicensed", 3GPP TSG RAN WG1 Meeting #96, R1-1902474, Greece, Feb. 25-Mar. 1, 2019.
Mediatek Inc., "Discussion on NR-U configured grant", 3GPP TSG RAN WG1 #96, R1-1901801, Athens, Greece, Feb. 25-Mar. 1, 2019.
Media Tek Inc., "Discussion on NR-U configured grant", 3GPP TSG RAN WG1 #97, R1-1906546, May 13-17, 2019, Reno, USA.
Intel Corporation, "Enhancements to configured grants for NR-unlicensed", 3GPP TSG RAN WG1 Meeting #97, R1-1906788, May 13-17, 2019, Reno, Nevada, USA.

* cited by examiner

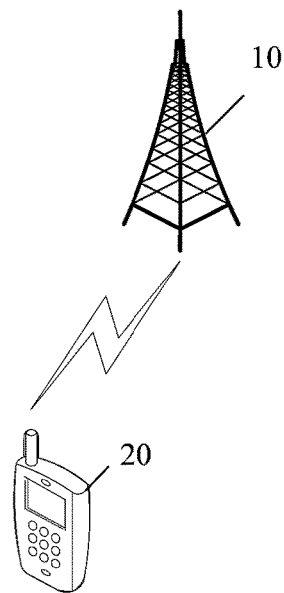
FIG. 1
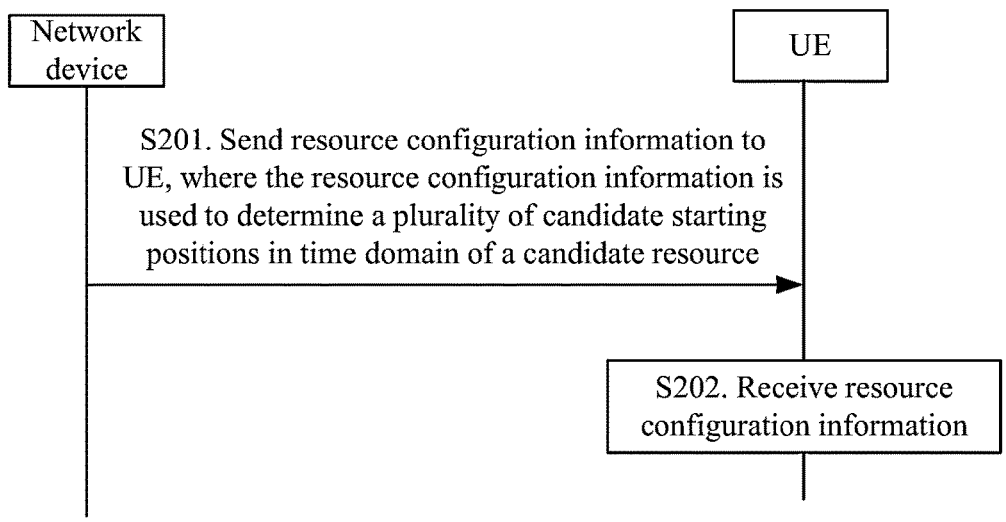
FIG. 2
FIG. 3

RESOURCE CONFIGURATION METHOD, DEVICE, AND SYSTEM

CROSS-REFERENCE TO RELATED APPLICATIONS

This application is a continuation application of PCT International Application No. PCT/CN2020/116506 filed on Sep. 21, 2020, which claims priority to Chinese Patent Application No. 201910914145.5 filed in China on Sep. 25, 2019, both of which are hereby incorporated by reference in their entireties.

TECHNICAL FIELD

Embodiments of the present disclosure relate to the field of communications technologies, and in particular, to a resource configuration method, a device, and a system.

BACKGROUND

There are two types of physical uplink shared channel (PUSCH), namely, a type A PUSCH and a type B PUSCH. In the type A PUSCH transmission, a start time domain position of the PUSCH is always a start symbol of a slot, and a demodulation reference signal (DMRS) is usually within a third or fourth symbol in a slot of the PUSCH transmission; and in the type B PUSCH transmission, the start time domain position of the PUSCH may be any symbol within a slot, and the DMRS is usually located in a first symbol of the PUSCH transmission.

In addition, since an unlicensed band is a band shared by a plurality of UEs, in the unlicensed band, the plurality of UEs may use the unlicensed band in a listen before talk (LBT) manner. Specifically, among the plurality of UEs, UE that obtains the unlicensed band through contention may use the unlicensed band to transmit data.

However, when the UE needs to transmit the PUSCH on the unlicensed band, since a time when the UE obtains the unlicensed band through contention is uncertain, for the foregoing two types of PUSCH, the time when the UE obtains the unlicensed band through contention may be within or after a symbol for transmitting the DMRS. In this way, an entire DMRS may not be transmitted, namely, information of the DMRS is lost, thereby affecting demodulation performance of the DMRS.

SUMMARY

According to a first aspect, an embodiment of the present disclosure provides a resource configuration method, applied to UE. The method includes: receiving resource configuration information sent by a network device, where the resource configuration information is used to determine a plurality of candidate starting positions in time domain of a candidate resource, the candidate resource is configured by the network device for transmitting an uplink signal, and the uplink signal includes a DMRS, where the plurality of candidate starting positions in time domain are all before a resource used to transmit the DMRS.

According to a second aspect, an embodiment of the present disclosure provides a resource configuration method, applied to a network device. The method includes: sending resource configuration information to UE, where the resource configuration information is used to determine a plurality of candidate starting positions in time domain of a candidate resource, the candidate resource is configured by the network device for transmitting an uplink signal, and the uplink signal includes a DMRS, where the plurality of candidate starting positions in time domain are all before a resource used to transmit the DMRS.

According to a third aspect, an embodiment of the present disclosure provides UE, and the UE includes a receiving module; and the receiving module is configured to receive resource configuration information sent by a network device, where the resource configuration information is used to determine a plurality of candidate starting positions in time domain of a candidate resource, the candidate resource is configured by the network device for transmitting an uplink signal, and the uplink signal includes a DMRS, where the plurality of candidate starting positions in time domain are all before a resource used to transmit the DMRS.

According to a fourth aspect, an embodiment of the present disclosure provides a network device, and the network device includes a sending module; and the sending module is configured to send resource configuration information to UE, where the resource configuration information is used to determine a plurality of candidate starting positions in time domain of a candidate resource, the candidate resource is configured by the network device for transmitting an uplink signal, and the uplink signal includes a DMRS, where the plurality of candidate starting positions in time domain are all before a resource used to transmit the DMRS.

According to a fifth aspect, an embodiment of the present disclosure provides UE, including a processor, a memory, and a computer program stored in the memory and capable of running on the processor. When the computer program is executed by the processor, steps of the resource configuration method according to the first aspect are implemented.

According to a sixth aspect, an embodiment of the present disclosure provides a network device, including a processor, a memory, and a computer program stored in the memory and capable of running on the processor. When the computer program is executed by the processor, steps of the resource configuration method according to the second aspect are implemented.

According to a seventh aspect, an embodiment of the present invention provides a communications system, where the communications system includes the UE of the third aspect and the network device of the fourth aspect; or the communications system includes the UE of the fifth aspect and the network device of the sixth aspect.

According to an eighth aspect, an embodiment of the present disclosure provides a computer readable storage medium, where the computer readable storage medium stores a computer program, and when the computer program is executed by a processor, steps of the resource configuration method according to the first aspect or the second aspect are implemented.

BRIEF DESCRIPTION OF DRAWINGS

FIG. 1 is a schematic diagram of a possible architecture of an Android operating system according to an embodiment of the present disclosure;

FIG. 2 is a schematic interaction diagram of a resource configuration method according to an embodiment of the present disclosure;

FIG. 3 is a first schematic diagram of a candidate resource according to an embodiment of the present disclosure;

DETAILED DESCRIPTION OF THE EMBODIMENTS

Figure 4:
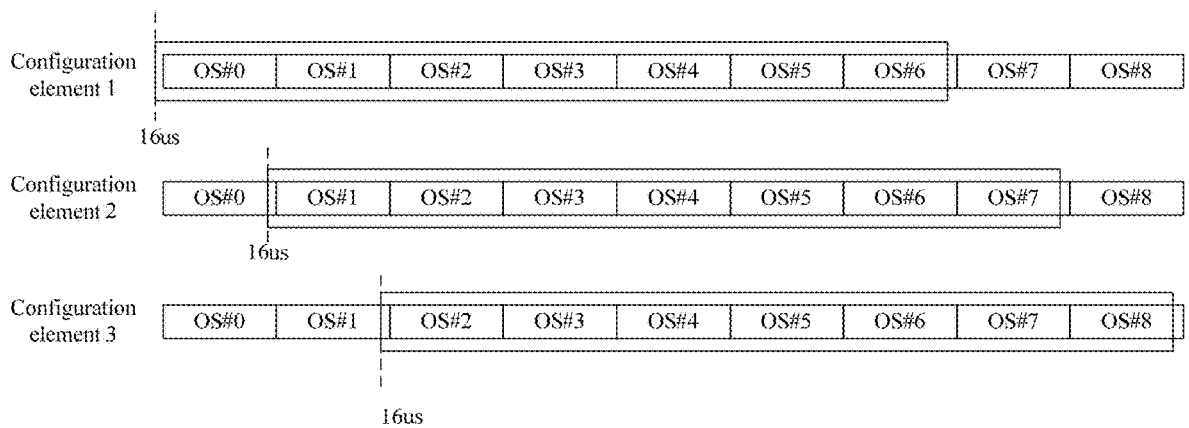
FIG. 4 is a second schematic diagram of a candidate resource according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

It should be noted that "/" in the specification indicates the meaning of "or", for example, A/B may indicate A or B; "and/or" in the specification merely describes the association relationship between the associated objects and indicates that there may be three relationships. For example, A and/or B may indicate three cases where only A exists, A and B exist at the same time, or only B exists. The term "a plurality of" refers to two or more.

Terms "first", "second", and the like in the specification and claims of the present disclosure are used to distinguish between different objects, and are not used to describe a specific sequence of the objects. For example, a first time domain position, a second time domain position, and the like are used to distinguish between different time domain positions, but are not used to describe a particular sequence of the time domain positions.

It should be noted that in the embodiments of the present disclosure, the term such as "exemplary" or "for example" is used for representing an example, an illustration, or a description. Any embodiment or design scheme described as an "exemplary" or "example" in the embodiments of the present disclosure should not be explained as being more preferred or having more advantages than another embodiment or design scheme. Exactly, use of the word such as "exemplary" or "example" is intended to present a concept in a specific manner.

For ease of understanding, the following describes some terms used in the present disclosure.

1. Clear Channel Detection

Before transmitting information in the unlicensed band, UE or a network device needs to perform clear channel assess (CCA) or extended clear channel assess (ECCA) to listen a channel, that is, perform energy detection (ED). When the energy is less than a threshold, the channel is judged to be empty, and transmission may be started, namely, LBT.

Because the unlicensed band is shared by a plurality of technologies or a plurality of transmission nodes, it is necessary to use the licensed band in a contention access manner.

There may be three LBT categories (cat) for an unlicensed communications system, namely:

(1) LBT cat 1: direct transmission may be performed without any CCA, and it may be used when the channel has been obtained and a transmission conversion interval is less than 16 us.

(2) LBT cat 2: 16 us or 25 us channel listening is performed, and it may be used for some specific signals to obtain a channel and a maximum continuous transmission length should be less than a certain value, such as 1 ms.

(3) LBT cat 3: channel listening with fusion random back-off, where different parameters are set for different priorities, and maximum transmission lengths of the channels are also different.

2. PUSCH Transmission Type

The PUSCH mapping type includes a type A (Type A) and a type B (Type B). The type A PUSCH and the type B PUSCH are respectively introduced below with reference to Table 1.

TABLE 1

| PUSCH transmission type | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 11} | {1, ..., 12} | {1, ..., 12} |

S represents a symbol position where PUSCH transmission starts, and L represents a length of a PUSCH symbol.

For the type A PUSCH, the DMRS is located in a fixed third symbol (symbol 2) or fourth symbol (symbol 3) within a transmission slot. A start point of the PUSCH transmission is a symbol 0. For the normal cyclic prefix (Normal cyclic prefix), the length of the PUSCH may be any length from 4 symbols to 14 symbols. For the extended cyclic prefix (Extended cyclic prefix), the length of the PUSCH may be any length from 4 symbols to 12 symbols.

For the type B PUSCH, the DMRS is always located in a first symbol of the PUSCH. For the normal cyclic prefix, the start point of the PUSCH transmission is any symbol from symbol 0 to symbol 13, the length of the PUSCH may be any length from 4 symbols to 14 symbols; and for the extended cyclic prefix, the start point of the PUSCH transmission is any symbol from symbol 0 to symbol 11, and the length of the PUSCH may be any length from 1 symbol to 12 symbols.

3. Puncturing Transmission

If a symbol is used to transmit another signal, it is assumed that a start transmission position is located at a position in the symbol, and no signal is transmitted before this position, and transmission starts from this position in the symbol, that is, the puncturing transmission is performed on a symbol corresponding to the signal, that is, part of information in the symbol may be lost.

The technical solutions provided in the present disclosure may be applied to various communications systems, for example, a 5G communications system, a future evolved system, or a plurality of communications fusion systems. A plurality of application scenarios may be included, for example, a machine to machine (M2M) scenario, a D2M scenario, a macro-micro communication scenario, an enhance mobile broadband (eMBB) scenario, an ultra reliable & low latency communication (uRLLC) scenario, and a massive machine type communication (mMTC) scenario. These scenarios include, but not limited to: scenarios such as communication between UE and UE, communication between network devices, or communication between a network device and UE. The embodiments of the present disclosure may be applied to communication between a network device and UE, communication between UE and UE, or communication between network devices in a 5G communications system.

FIG. 1 is a possible schematic structural diagram of a communications system according to an embodiment of the present disclosure. As shown in FIG. 1, the communications system includes at least one network device 10 (only one network device is used as an example for description in FIG. 1) and one or more UE 20 (only one UE is used as an example for description in FIG. 1) connected to each network device 10. In the embodiments of the present disclosure, only 5G communications system is used as an example for description, but should not be used as a scenario limitation of the embodiments of the present disclosure.

The foregoing network device 10 may be a base station, a core network device, a transmission and reception point (TRP), a relay station, an access point, or the like. The network device 10 may be a base transceiver station (BTS) in a global system for mobile communication (GSM) or a code division multiple access (CDMA) network, may be an NB (NodeB) in wideband code division multiple access (WCDMA), or may be an eNB or an eNodeB (evolved NodeB) in LTE. The network device 10 may be alternatively a wireless controller in a cloud radio access network (CRAN) scenario. The network device 10 may be alternatively a network device in the 5G communications system or a network device in a future evolved network. However, the term used does not constitute a limitation to the present disclosure.

The UE 101 may be wireless UE or wired UE. The wireless UE may be a device that provides voice and/or other service data connectivity for a user, a handheld device with a wireless communication function, a computing device, another processing device connected to a wireless modem, an in-vehicle device, a wearable device, UE in a future 5G network, UE in a future evolved PLMN network, or the like. The wireless UE may communicate with one or more core networks by using a radio access network (RAN). The wireless UE may be a mobile UE such as a mobile phone (or referred to as a "cellular" phone) and a computer with a mobile UE. For example, the wireless UE may be a portable, pocket-sized, handheld, computer built-in, or in-vehicle mobile apparatus that exchanges voice and/or data with a radio access network, and a device such as a personal communication service (PCS) phone, a cordless phone, a session initiation protocol (SIP) phone, a wireless local loop (WLL) station, or a personal digital assistant (PDA). The wireless UE may be alternatively a mobile device, a terminal device, an access terminal device, a wireless communications device, a terminal device unit, a terminal device station, a mobile station, a mobile console (Mobile), a remote station, a remote terminal, a subscriber unit, a subscriber station, a user agent, a terminal device apparatus, or the like. As an example, in this embodiment of the present disclosure, a mobile phone is shown as an example of UE in FIG. 1.

The method for resource configuration in the embodiments of the present disclosure is described below with reference to FIG. 2. FIG. 2 is a schematic flowchart of interaction of a resource configuration method according to an embodiment of the present disclosure. As shown in FIG. 2, the resource configuration method includes S201 and S202.

S201. A network device sends resource configuration information to UE, where the resource configuration information is used to determine a plurality of candidate starting positions in time domain of a candidate resource, the candidate resource is configured by the network device for transmitting an uplink signal, and the uplink signal includes a DMRS.

The plurality of candidate starting positions in time domain are all before a resource used to transmit the DMRS.

In this embodiment of the present disclosure, the foregoing resource used to transmit the DMRS may be a resource in candidate resources.

Specifically, the plurality of candidate starting positions in time domain are all before a start time domain position of the resource used to transmit the DMRS.

For example, the candidate resource may be a resource configured by the network device for the UE to transmit the PUSCH.

S202. The UE receives the resource configuration information sent by the network device.

It should be noted that the network device may use the resource configuration method in the embodiments of the present disclosure to configure a transmission resource of an unlicensed band for the UE.

In the resource configuration method provided in the embodiments of the present disclosure, the network device may send the resource configuration information to the UE, and the resource configuration information may be used to determine the plurality of candidate starting positions in time domain of the candidate resource. Since the plurality of candidate starting positions in time domain are all before the resource used to transmit the DMRS, after the UE receives the configuration information sent by the network device, if the UE obtains any transmission resource corresponding to the plurality of candidate starting positions in time domain in the configuration information through contention, puncturing transmission for the DMRS may be avoided, and transmission of the DMRS may be guaranteed when the uplink signal is transmitted, thereby avoiding the problem that part or all of the DMRS in the currently obtained transmission resource is lost and affects demodulation performance.

Optionally, after S202, the resource configuration method provided in the embodiments of the present disclosure may further include S203 as follows.

S203. The UE starts transmission from a first start time domain position among the plurality of candidate starting positions in time domain based on the resource configuration information.

Specifically, in the resource configuration method provided in the embodiments of the present disclosure, S203 described above may be implemented through S203a to S203c.

S203a. The UE determines at least one candidate starting position in time domain among the plurality of candidate starting positions in time domain based on the resource configuration information.

S203b. The UE determines a first start time domain position from the foregoing at least one candidate starting position in time domain.

It should be noted that, after the UE determines the first start time domain position, if LBT needs to be performed, the UE may start LBT for the first start time domain position. If the UE preempts a channel corresponding to the first start time domain position, the UE performs S203c as follows, and if the UE does not preempt the channel, the UE cannot start transmission from the first start time domain position.

S203c. The UE starts transmission from the first start time domain position.

In this solution, the UE may determine a plurality of candidate starting positions in time domain based on the resource configuration information. Since the plurality of candidate starting positions in time domain are all before the resource used to transmit the DMRS, the UE may transmit an entire DMRS in the transmission that from the plurality of candidate starting positions in time domain. This can not only prevent information loss of the DMRS from affecting the demodulation performance of the DMRS, and ensure the demodulation performance, but also can increase a multiplexing rate of the channel, reduce resource conflicts, and further improve the transmission performance.

Optionally, the foregoing first start time domain position may be configured by the network device or selected by the UE.

Specifically, in the resource configuration method provided in the embodiments of the present disclosure, S203b described above may be implemented through S203b1 and S203b2 as follows, or may be implemented through S203b3 as follows.

S203b1. The network device sends target configuration information to the UE, where the target configuration information is used to configure the UE with a first start time domain position among the plurality of candidate starting positions in time domain.

It may be understood that, in a case that the network device sends the resource configuration information to the UE, the network device may further configure the UE with the first start time domain position among the plurality of candidate starting positions in time domain corresponding to the resource configuration information, indicating to the UE that the start time domain position is the start time domain position where the uplink signal actually starts to be transmitted.

Optionally, the target configuration information may carry the first start time domain position, or may carry an identifier indicating the first start time domain position.

For example, identifiers of the plurality of start time domain positions indicated by the resource configuration information may be stored in the network device and the UE. The network device may generate a random number based on at least one of an identifier of the UE (for example, ID of the UE) and a time/frequency resource position of the candidate resource, and determine an identifier indicating the start time domain position.

S203b2. The UE determines the start time domain position configured by the network device through the target configuration information among the foregoing plurality of candidate starting positions in time domain as the first start time domain position.

Certainly, the UE may also select the first start time domain position from the plurality of candidate starting positions in time domain indicated in the resource configuration information.

S203b3. The UE determines a start time domain position randomly selected from the foregoing plurality of candidate starting positions in time domain as the first start time domain position.

Specifically, the UE may store identifiers of the plurality of start time domain positions indicated by the resource configuration information, and the UE may also generate a random number based on at least one of the identifier of the UE (for example, ID of the UE) and the time/frequency resource position of the candidate resource. One identifier is determined based on the random number, and then the first start time domain position where the UE starts transmission is determined based on the identifier.

In this solution, the UE may determine the first start time domain position in various ways. The first start time domain position may be determined based on the target configuration information sent by the network device, or the first start time domain position may be determined based on the resource configuration information sent by the network device, and determination methods are more flexible and diverse.

Optionally, in this embodiment of the present disclosure, the resource configuration information includes at least one of the following: a plurality of pieces of offset position information and a plurality of pieces of transmission resource information.

Each piece of offset position information in the foregoing plurality of pieces of offset position information is used to indicate an offset, and each piece of transmission resource information in the plurality of pieces of transmission resource information is used to indicate a candidate resource.

In other words, the resource configuration information may include a plurality of pieces of offset position information (a first implementation), the resource configuration information may also include a plurality of pieces of transmission resource information (a second implementation), and the resource configuration information may also include a plurality of pieces of offset position information and a plurality of pieces of transmission resource information (a third implementation).

Optionally, in this embodiment of the present disclosure, the foregoing plurality of candidate starting positions in time domain are determined based on a plurality of offsets indicated by the foregoing plurality of pieces of offset position information and a start time domain position of a corresponding candidate resource.

In other words, the UE or the network device may determine the plurality of candidate starting positions in time domain based on a start time domain position of one candidate resource and a plurality of offsets.

The first implementation: the resource configuration information includes a plurality of pieces of offset position information.

It should be noted that, there is one candidate resource in the first implementation. That is, the candidate resource may be a resource configured by the network device for transmitting an uplink signal (hereinafter referred to as a target uplink signal) that needs to be transmitted in this embodiment of the present disclosure. The target uplink signal may be an uplink signal carried by the PUSCH.

In this embodiment of the present disclosure, after the UE determines the plurality of candidate starting positions in time domain, LBT may be performed based on one of the candidate starting positions in time domain.

Optionally, in this embodiment of the present disclosure, the candidate starting position in time domain may be a time domain position before the start time domain position of the candidate resource, or may be a time domain position after the start time domain position of the candidate resource.

Optionally, the offset in this embodiment of the present disclosure may be a time domain position after the offset, or an offset time domain length. Specifically, in a case that the offset is the time domain position after the offset, the candidate starting position in time domain is a time domain position corresponding to the offset; that is, the UE may determine the time domain position corresponding to the offset based on the start time domain position of the candidate resource, so as to obtain the candidate starting position in time domain. In a case that the offset is the offset time domain length, the candidate starting position in time domain may be the start time domain position of the candidate resource±offset. That is, in a case that the offset is the offset time domain length, an offset indicated by one piece of offset position information may be a positive number or a negative number. Alternatively, the offset is a positive value, and the UE may choose to shift forward to the start time domain position of the candidate resource, or shift backward to the start time domain position of the candidate resource based on actual situation.

For example, in a case that the offset is the time domain position after the offset, the foregoing plurality of pieces of offset position information may be an offset position set. For example, an offset position set may be {the $16^{th}$ us in OS #0, the $25^{th}$ us in OS #0, the $34^{th}$ us in OS #0, a start time domain position of OS #1}. That is, the UE may determine, based on the start time domain position of the candidate resource, that a time domain position corresponding to the $16^{th}$ us in OS #0, a time domain position corresponding to the $25^{th}$ us in OS #0, a time domain position corresponding to the $34^{th}$ us in OS #0, and a start time domain position of OS #1 are a plurality of candidate starting positions in time domain. OS #1 is any symbol before a symbol where the DMRS is located.

For another example, in a case that the offset is the offset time domain length, the foregoing plurality of pieces of offset position information may be an offset length set. For example, an offset length set may be {16 us, 25 us, 34 us}. That is, the UE may determine, based on the start time domain position of the candidate resource, that a time domain position corresponding to the 16 us, a time domain position corresponding to the 25 us, and a time domain position corresponding to the 34 us that are before/after the start time domain position are a plurality of candidate starting positions in time domain.

It should be noted that, in this embodiment of the present disclosure, "OS #1" in the offset position set refers to an end position of the symbol 0 or a start time domain position of the symbol 1.

It should be noted that, in this embodiment of the present disclosure, offsets of 16 us, 25 us, 34 us are taken as examples for description, and other offsets, such as 5 us, 15 us, and 20 us may also be used in practical application.

In this solution, the UE or the network device may determine the plurality of candidate starting positions in time domain based on a plurality of offsets indicated by the plurality of pieces of offset position information in the resource configuration information and a start time domain position of a candidate resource.

The second implementation: the resource configuration information includes a plurality of pieces of transmission resource information.

Optionally, in this embodiment of the present disclosure, in the second implementation, the start time domain positions of the plurality of candidate resources indicated by the foregoing plurality of pieces of transmission resource information are the foregoing plurality of candidate starting positions in time domain.

It should be noted that, each of the foregoing plurality of candidate resources may include at least two of a start time domain position, an end time domain position, a resource length, and the like.

In this embodiment of the present disclosure, the UE may determine one candidate resource to perform LBT from the plurality of candidate resources indicated by the plurality of pieces of transmission resource information, and if the UE obtains the candidate resource through contention, the UE may start transmission from the candidate resource.

In this solution, since a plurality of pieces of transmission resource configuration information indicate a plurality of candidate resources, the UE may start transmission from a start time domain position of any one of the plurality of candidate resources, and the resource for transmitting the DMRS is located in the plurality of candidate resources, that is, start time domain positions of the UE to start transmission are all located before the resource for transmitting the DMRS. In this way, not only a part of or the entire DMRS may be prevented from losing, but also a probability of the UE colliding with other UE in resource contention may be reduced.

Optionally, in this embodiment of the present disclosure, the foregoing plurality of candidate resources have a same resource length and different start time domain positions.

For example, the plurality of pieces of transmission resource information may indicate one resource set. For example, the resource set is {OS #0-OS #6, OS #1-OS #7, OS #2-OS #8} in a slot. If a resource 1 is from OS #0 to OS #6, a resource 2 is from OS #1 to OS #7, a resource 3 is from OS #2 to OS #8, and lengths of the three resources are all 7 symbols, a start time domain position of the resource 1 is a start time domain position of the symbol 0, a start time domain position of the resource 2 is a start time domain position of the symbol 1, and a start time domain position of the resource 3 is a start time domain position of the symbol 3.

FIG. 3 is a schematic diagram of a candidate resource according to an embodiment of the present disclosure. It is assumed that the resource configuration information includes: transmission resource information 1, transmission resource information 2, and transmission resource information 3. As shown in FIG. 3, the candidate resource 1 indicated by the transmission resource information 1 is a resource from OS #0 to OS #6; the candidate resource 2 indicated by the transmission resource information 2 is a resource from the OS #1 to OS #7; and the candidate resource 3 indicated by the transmission resource information 3 is a resource from OS #2 to OS #8. In other words, the UE may select a resource from the symbol 0 to the symbol 6 for LBT, or may select a resource from the symbol 1 to the symbol 7 for LBT, or may select a resource from the symbol 2 to the symbol 8 for LBT.

The third implementation: the resource configuration information includes a plurality of pieces of offset position information and a plurality of pieces of transmission resource information.

Optionally, in the third implementation, the resource configuration information may include a plurality of configuration elements, each configuration element includes a piece of transmission resource information and an offset, or the resource configuration information may include an offset set (including a plurality of offsets) and a resource information set (including a plurality of pieces of transmission resource information).

It should be noted that in a case that the resource configuration information includes a plurality of configuration elements, the UE or the network device may select one of the configuration elements to determine a start time domain position; in a case that the resource configuration information includes the offset set and the resource information set, the UE or the network device may select an offset from the offset set, select a piece of transmission resource information from the resource information set, and determine a start time domain position based on the offset selected from the offset set and a candidate resource indicated by the transmission resource information selected from the resource information set.

For example, the resource configuration information may include: transmission resource information 1 and an offset 1, transmission resource information 2 and an offset 2, transmission resource information 3 and an offset 3; and the resource configuration information may also include: {offset 1, offset 2, offset 3} and {transmission resource information 1, transmission resource information 2, transmission resource information 3}.

For example, FIG. 4 is a schematic diagram of a candidate resource according to an embodiment of the present disclosure. As shown in FIG. 4, the resource configuration information includes: a configuration element 1: a resource 1 is from OS #0 to OS #6, and an offset is 16 us; a configuration element 2: a resource 2 is from OS #1 to OS #7, and an offset is 16 us; and a configuration element 3: a resource 3 is from OS #2 to OS #8, and an offset is 16 us. The UE may use any configuration to determine a start time domain position.

It should be noted that in FIG. 4, that the offsets in the three configuration elements are all 16 us is taken as an example for illustration. In practical application, different candidate resources may use a same offset or different offsets, which is not specifically limited by the embodiments of the present disclosure.

Optionally, in this embodiment of the present disclosure, in the first implementation and the third implementation mentioned above, a candidate starting position in time domain determined based on each offset in the plurality of offsets and a start time domain position of a corresponding candidate resource is any one of the following:

(1) any time domain position before a sub-time domain unit in which the DMRS is transmitted in a first time domain unit; and (2) any time domain position in a second time domain unit.

The first time domain unit is a time domain unit in which the candidate resource is located, and the second time domain unit is a time domain unit located before the first time domain unit.

It should be noted that, in the foregoing first implementation, the foregoing corresponding candidate resource is a resource configured by the network device in other ways and used for transmitting the foregoing target uplink signal. In this case, there is one candidate resource. In the foregoing third implementation, the foregoing corresponding candidate resource is a resource configured by the network device through the foregoing resource configuration information and used for transmitting the foregoing target uplink signal (for example, the plurality of candidate resources indicated by the plurality of pieces of transmission resource information described in the foregoing second implementation). In this case, there are a plurality of candidate resources.

The following respectively uses examples to describe (1) and (2) described above with reference to each example.

For (1) described above, the candidate starting position in time domain is any time domain position before a sub-time domain unit in which the DMRS is transmitted in a first time domain unit.

For the type A PUSCH, the sub-time domain unit in which the DMRS is transmitted may be a third symbol or a fourth symbol in a transmission slot (namely, a slot used to transmit the PUSCH).

For the type A PUSCH, in a case that the sub-time domain unit in which the DMRS is transmitted is the third symbol in the transmission slot, the candidate starting position in time domain may be any time domain position of a first symbol (namely, OS #0) in the transmission slot, the candidate starting position in time domain may be any time domain position of a second symbol (namely, OS #1) in the transmission slot, and the candidate starting position in time domain may also be any time domain position of the first symbol and the second symbol in the transmission slot.

EXAMPLE 1

For the type A PUSCH, the candidate starting position in time domain is any time domain position of the first symbol and the second symbol of the transmission slot.

Figure 5:
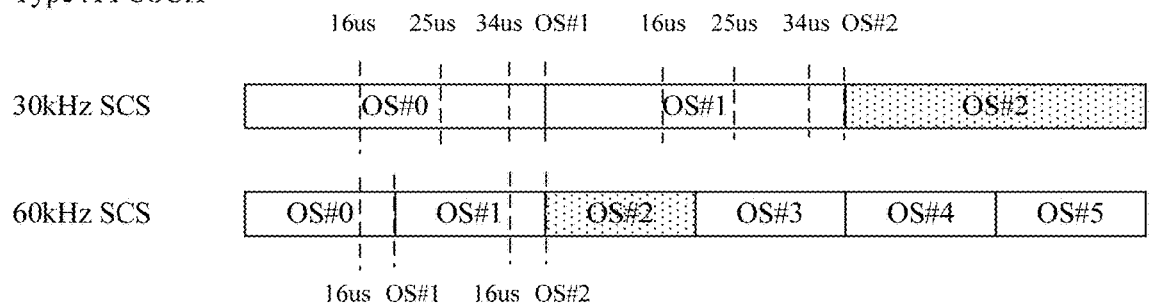
FIG. 5 is a third schematic diagram of a candidate resource according to an embodiment of the present disclosure.

For example, as shown in FIG. 5, for a subcarrier spacing of 30 kHz, the candidate starting position in time domain may be any one of $\{16^{th}$ us in OS #0, $25^{th}$ us in OS #0, $34^{th}$ us in OS #0, a start time domain position of OS #1, $16^{th}$ us in OS #1, $25^{th}$ us in OS #1, $34^{th}$ us in OS #1, a start time domain position of OS #2$\}$. For a subcarrier spacing of 60 kHz, as shown in FIG. 5, the candidate starting position in time domain may be any one of $\{16^{th}$ us in OS #0, a start time domain position of OS #1, $16^{th}$ us in OS #1, a start time domain position of OS #2$\}$.

It may be understood that, in this embodiment of the present disclosure, the candidate starting positions in time domain are all located before the resources for transmitting the DMRS, and are not after start time domain positions for transmitting the DMRS. Therefore, it may be avoided that information of the DMRS is lost, and affecting the demodulation performance of the DMRS.

For the type A PUSCH, in a case that the sub-time domain unit in which the DMRS is transmitted is the fourth symbol in the transmission slot, the candidate starting position in time domain may be any time domain position of a first symbol in the transmission slot, the candidate starting position in time domain may be any time domain position of a second symbol in the transmission slot, the candidate starting position in time domain may be any time domain position of a third symbol in the transmission slot, the candidate starting position in time domain may be any time domain position of any two symbols in the first symbol, the second symbol, and the third symbol in the transmission slot, and the candidate starting position in time domain may be any time domain position of the first symbol, the second symbol, and the third symbol in the transmission slot.

It should be noted that, in this embodiment of the present disclosure, the candidate starting position in time domain may be any position from a start time domain position to an end time domain position of a symbol.

For the type B PUSCH, since the sub-time domain unit in which the DMRS is transmitted is a first symbol in the candidate resource, the candidate starting position in time domain may be any time domain position before a first symbol in symbols for transmitting the PUSCH.

For the type B PUSCH, if the start time domain position of the candidate resource is a $K^{th}$ symbol (that is, the symbol for transmitting the DMRS is OS #K), the candidate starting position in time domain is any time domain position before the $K^{th}$ symbol in the transmission slot. For example, the candidate starting position in time domain may be any time domain position in a $(K-1)^{th}$ symbol in the transmission slot.

For example, if the sub-time domain unit in which the DMRS is transmitted is the second symbol, the candidate starting position in time domain may be any position in the first symbol of the transmission slot; if the sub-time domain unit in which the DMRS is transmitted is the third symbol, the candidate starting position in time domain may be any position in the first symbol, the candidate starting position in time domain may be any position in the second symbol, and the candidate starting position in time domain may also be any position in the first symbol and the second symbol. The time domain unit in which the DMRS is transmitted is located in a fourth symbol to a fourteenth symbol. Reference may be made to the foregoing description, and so on. Details are not repeated herein again.

EXAMPLE 2

For the type B PUSCH, if the start time domain position of the candidate resource is the second symbol of the transmission slot, the candidate starting position in time domain is any position within the first symbol of the transmission slot.

Figure 6:
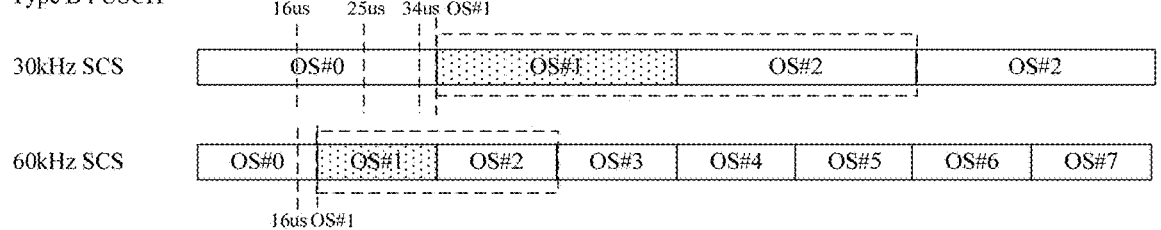
FIG. 6 is a fourth schematic diagram of a candidate resource according to an embodiment of the present disclosure.

For example, as shown in FIG. 6, for a subcarrier spacing of 30 kHz, the candidate starting position in time domain may be any one of $16^{th}$ us in OS #0, $25^{th}$ us in OS #0, $34^{th}$ us in OS #0, and a start time domain position of OS #1. For a subcarrier spacing of 60 kHz, the candidate starting position in time domain may be any one of $16^{th}$ us in OS #0 and a start time domain position of OS #1.

For (2) described above, the candidate starting position in time domain is any time domain position in a second time domain unit.

For both the type A PUSCH and the type B PUSCH, the candidate starting position in time domain may be any time domain position in first K slots of a slot in which the PUSCH is transmitted, and K is a positive integer.

Specifically, in the type B PUSCH, for a PUSCH whose resource length is a mini-slot, a first time domain unit is a mini-slot in which the PUSCH is transmitted, and a second time domain unit may be a mini-slot before the mini-slot in which the PUSCH is transmitted.

EXAMPLE 3

The candidate starting position in time domain is within a last symbol of a slot before the transmission slot.

For example, for the Type A PUSCH: a DMRS signal is carried in the third symbol. For the subcarrier spacing of 30 kHz, the candidate starting position in time domain may be at least one of $\{16^{th}$ us in a last symbol of a slot before the transmission slot, $25^{th}$ us in a last symbol of a slot before the transmission slot, $34^{th}$ us in a last symbol of a slot before the transmission slot, or a start time domain position of OS #0 in the transmission slot$\}$. For the subcarrier spacing of 60 kHz, the candidate starting position in time domain may be at least one of $\{16^{th}$ us in a last symbol of a slot before the transmission slot and a start time domain position of OS #0 in the transmission slot$\}$.

For example, for the type B PUSCH, a length of the candidate resource PUSCH is 2 symbols, and the start time domain position is the first symbol. For the subcarrier spacing of 30 kHz, the candidate starting position in time domain may be at least one of the $16^{th}$ us, the $25^{th}$ us, and the $34^{th}$ us in a last symbol of a slot before the transmission slot, and the start time domain position of OS #0 in the transmission slot. For the subcarrier spacing of 60 kHz, a set of the candidate starting position in time domain may be at least one of $16^{th}$ us in a last symbol of a slot before the transmission slot or a start time domain position of OS #0 of the transmission slot.

Optionally, in this embodiment of the present disclosure, a resource between each of the foregoing plurality of candidate starting positions in time domain to the start time domain position of the candidate resource may be used to carry other information except the foregoing target uplink signal.

It should be noted that, in this solution, if the first start time domain position is before the start time domain position of the resource for transmitting the target uplink signal, a resource between the first start time domain position and the start time domain position for transmitting the target uplink signal carries other information except the target uplink signal.

Optionally, in this embodiment of the present disclosure, a resource from the first start time domain position to the second start time domain position carries other information except the target uplink signal, and the second start time domain position is a time domain position for transmitting the target uplink signal.

It should be noted that, after the UE determines the candidate starting position in time domain, the UE may carry other information except the target uplink signal on a symbol between the candidate starting position in time domain and the start time domain position of the candidate resource. In other words, the information except the target uplink signal may be transmitted through a resource between the first start time domain position to the second start time domain position, and the target uplink signal may be transmitted at the second start time domain position.

For example, other information except the target uplink signal mentioned above may be a cyclic prefix CP or a sounding reference signal (SRS). Certainly, the UE may also carry other information on the resource between the first start time domain position and the second start time domain position.

In this solution, if the UE obtains, through contention, a candidate resource corresponding to a candidate starting position in time domain through LBT, the UE may carry other information except the target uplink signal on the resource between the first start time domain position and the second start time domain position, to prevent a channel corresponding to this time domain resource from being occupied by other UE.

Figure 7:
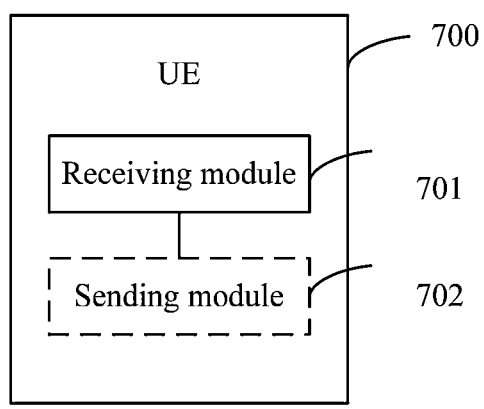
FIG. 7 is a possible schematic structural diagram of UE according to an embodiment of the present disclosure.

FIG. 7 is a possible schematic structural diagram of UE according to an embodiment of the present disclosure. As shown in FIG. 7, the UE 700 includes a receiving module 701, the receiving module 701 is configured to receive resource configuration information sent by a network device, where the resource configuration information is used to determine a plurality of candidate starting positions in time domain of a candidate resource, the candidate resource is configured by the network device for transmitting an uplink signal, and the uplink signal includes a DMRS, where the plurality of candidate starting positions in time domain are all before a resource used to transmit the DMRS. The uplink signal may be a target uplink signal in the foregoing embodiment.

Optionally, the resource configuration information includes at least one of the following: a plurality of pieces of offset position information and a plurality of pieces of transmission resource information, where each piece of offset position information in the plurality of pieces of offset position information is used to indicate an offset, and each piece of transmission resource information in the plurality of pieces of transmission resource information is used to indicate a candidate resource.

Optionally, the plurality of candidate starting positions in time domain are determined based on a plurality of offsets indicated by the plurality of pieces of offset position information and a start time domain position of a corresponding candidate resource.

Optionally, the candidate starting position in time domain determined based on each offset in the plurality of offsets and the start time domain position of the corresponding candidate resource is any one of the following: any time domain position before a sub-time domain unit in which the DMRS is transmitted in a first time domain unit, and any time domain position in a second time domain unit, where the first time domain unit is a time domain unit in which the candidate resource is located, and the second time domain unit is a time domain unit located before the first time domain unit.

Optionally, start time domain positions of a plurality of candidate resources indicated by the plurality of pieces of transmission resource information are the plurality of candidate starting positions in time domain.

Optionally, the plurality of candidate resources indicated by the plurality of pieces of transmission resource information have a same resource length and different start time domain positions.

Optionally, with reference to FIG. 7, the UE 700 further includes a sending module 702, the sending module 702 is configured to: after the receiving module 701 receives the resource configuration information sent by the network device, start transmission from a first start time domain position among the plurality of candidate starting positions in time domain based on the resource configuration information.

Optionally, a resource between the first start time domain position and the second start time domain position carries other information except the uplink signal, and the second start time domain position is a time domain position for starting transmitting the uplink signal.

Optionally, the first start time domain position is configured by the network device or selected by the UE.

The UE 700 provided in this embodiment of the present disclosure can implement the processes implemented by the UE in the foregoing method embodiments. To avoid repetition, details are not described herein again.

The UE provided in the embodiments of the present disclosure may receive the resource configuration information sent by the network device, and the resource configuration information may be used to determine the plurality of candidate starting positions in time domain of the candidate resource. Since the plurality of candidate starting positions in time domain are all before the resource used to transmit the DMRS, after the UE receives the configuration information sent by the network device, if the UE obtains any candidate resource corresponding to the plurality of candidate starting positions in time domain in the configuration information through contention, puncturing transmission for the DMRS may be avoided, and transmission of the DMRS may be guaranteed when the uplink signal is transmitted, thereby avoiding the problem that part or all of the DMRS in the currently obtained transmission resource is lost and affects demodulation performance.

Figure 8:
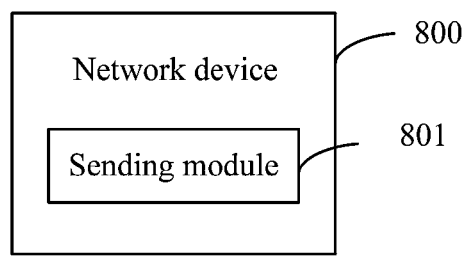
FIG. 8 is a possible schematic structural diagram of a network device according to an embodiment of the present disclosure.

FIG. 8 is a possible schematic structural diagram of a network device according to an embodiment of the present disclosure. As shown in FIG. 8, the network device 800 includes a sending module 801, configured to send resource configuration information to UE, where the resource configuration information is used to determine a plurality of candidate starting positions in time domain of a candidate resource, the candidate resource is configured by the network device for transmitting an uplink signal, and the uplink signal includes a demodulation reference signal DMRS, where the plurality of candidate starting positions in time domain are all before a resource used to transmit the DMRS. The uplink signal may be a target uplink signal in the foregoing embodiment.

Optionally, the resource configuration information includes at least one of the following: a plurality of pieces of offset position information and a plurality of pieces of transmission resource information, where each piece of offset position information in the plurality of pieces of offset position information is used to indicate an offset, and each piece of transmission resource information in the plurality of pieces of transmission resource information is used to indicate a candidate resource.

Optionally, the plurality of candidate starting positions in time domain are determined based on a plurality of offsets indicated by the plurality of pieces of offset position information and a start time domain position of a corresponding candidate resource.

Optionally, the candidate starting position in time domain determined based on each offset in the plurality of offsets and the start time domain position of the corresponding candidate resource is any one of the following: any time domain position before a sub-time domain unit in which the DMRS is transmitted in a first time domain unit, and any time domain position in a second time domain unit, where the first time domain unit is a time domain unit in which the candidate resource is located, and the second time domain unit is a time domain unit located before the first time domain unit.

Optionally, start time domain positions of a plurality of candidate resources indicated by the plurality of pieces of transmission resource information are the plurality of candidate starting positions in time domain.

Optionally, the plurality of candidate resources have a same resource length and different start time domain positions.

The network device 800 provided in this embodiment of the present disclosure can implement the processes implemented by the network device in the foregoing method embodiment. To avoid repetition, details are not described herein again.

The network device provided in the embodiments of the present disclosure may send the resource configuration information to the UE, and the resource configuration information may be used to determine the plurality of candidate starting positions in time domain of the candidate resource. Since the plurality of candidate starting positions in time domain are all before a position used to transmit the DMRS, after the UE receives the configuration information sent by the network device, if the UE obtains any candidate resource corresponding to the plurality of candidate starting positions in time domain in the configuration information through contention, puncturing transmission for the DMRS may be avoided, and transmission of the DMRS may be guaranteed when the uplink signal is transmitted, thereby avoiding the problem that part or all of the DMRS in the currently obtained transmission resource is lost and affects demodulation performance.

Figure 9:
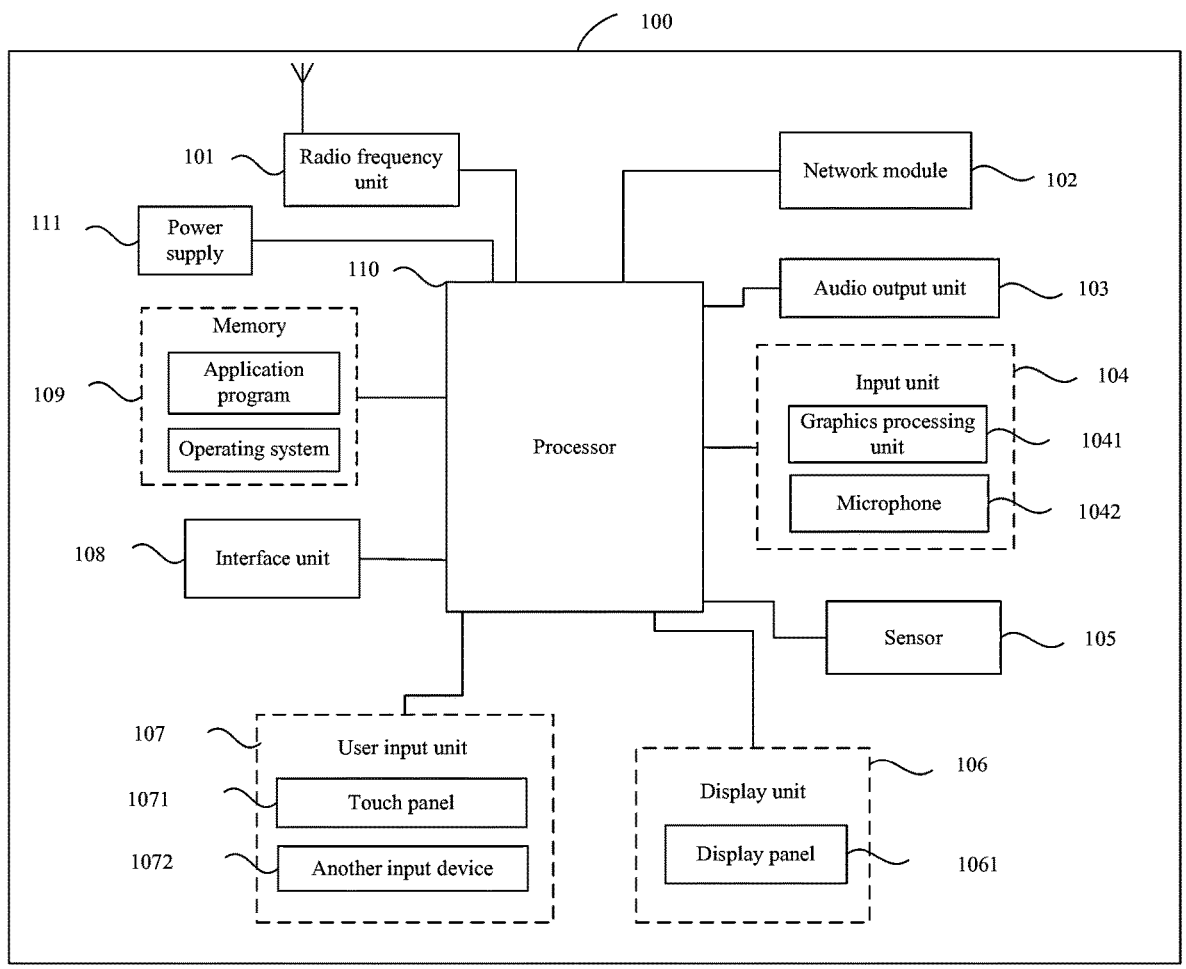
FIG. 9 is a schematic diagram of hardware of UE according to an embodiment of the present disclosure.

FIG. 9 is a schematic diagram of hardware of UE according to the embodiments of the present disclosure. The UE 100 includes, but not limited to: a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a UE structure shown in FIG. 9 does not constitute any limitation on the UE, and the UE may include more or fewer components than those shown in the figure, or some components are combined, or a different component deployment is used. In this embodiment of the present disclosure, the UE includes, but not limited to: a mobile phone, a tablet computer, a notebook computer, a palmtop computer, a vehicle-mounted UE, a wearable device, and a pedometer.

The radio frequency unit 101 is configured to receive resource configuration information sent by the network device, where the resource configuration information is used to determine a plurality of candidate starting positions in time domain of a candidate resource, the candidate resource is configured by the network device for transmitting an uplink signal, and the uplink signal includes a DMRS, where the plurality of candidate starting positions in time domain are all before a resource used to transmit the DMRS. The uplink signal may be a target uplink signal in the foregoing embodiment.

The UE provided in the embodiments of the present disclosure may receive the resource configuration information sent by the network device, and the resource configuration information may be used to determine the plurality of candidate starting positions in time domain of the candidate resource. Since the plurality of candidate starting positions in time domain are all before the resource used to transmit the DMRS, after the UE receives the configuration information sent by the network device, if the UE obtains any candidate resource corresponding to the plurality of candidate starting positions in time domain in the configuration information through contention, puncturing transmission for the DMRS may be avoided, and transmission of the DMRS may be guaranteed when the uplink signal is transmitted, thereby avoiding the problem that part or all of the DMRS in the currently obtained transmission resource is lost and affects demodulation performance.

It should be understood that, in this embodiment of the present disclosure, the radio frequency unit 101 may be configured to receive and transmit information, or receive and transmit signals during a call. Specifically, the radio frequency unit 101 receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device by using a wireless communications system and network.

The UE provides a user with wireless broadband Internet access by using the network module 102, for example, helps the user send and receive emails, browse web pages, and access streaming media.

The audio output unit 103 may convert audio data received by the radio frequency unit 101 or the network module 102 or stored in the memory 109 into an audio signal, and output the audio signal into sound. In addition, the audio output unit 103 may further provide audio output (for example, call signal receiving sound or message receiving sound) related to a specific function performed by the UE 100. The audio output unit 103 includes a speaker, a buzzer, a telephone receiver, and the like.

The input unit 104 is configured to receive an audio signal or a video signal. The input unit 104 may include a graphics processing unit (GPU) 1041 and a microphone 1042. The graphics processing unit 1041 is used to process image data of a static picture or a video obtained by an image capturing apparatus (for example, a camera) in a video capturing mode or an image capturing mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such a sound into audio data. The processed audio data may be converted, in a call mode, into a format that may be sent to a mobile communication base station by using the radio frequency unit 101 for output.

The UE 100 further includes at least one sensor 105, for example, a light sensor, a motion sensor, and another sensor. Specifically, the light sensor includes an ambient light sensor and a proximity sensor. The ambient light sensor may adjust luminance of the display panel 1061 based on brightness of ambient light. The proximity sensor may turn off the display panel 1061 and/or backlight when the UE 100 is moved to an ear. As a motion sensor, an accelerometer sensor may detect magnitude of acceleration in various directions (usually three axes), may detect magnitude and the direction of gravity when stationary, may be configured to identify UE postures (such as horizontal and vertical orientation switch, related games, and magnetometer posture calibration), may perform functions related to vibration identification (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein again.

The display unit 106 is configured to display information entered by a user or information provided for a user. The display unit 106 may include the display panel 1061, and the display panel 1061 may be configured in a form of a liquid crystal display (LCD), an organic light-emitting diode (OLED), or the like.

The user input unit 107 may be configured to receive input numeric or character information, and generate key signal inputs related to user settings and function control of the UE.

Specifically, the user input unit 107 includes a touch panel 1071 and another input device 1072. The touch panel 1071 is also referred to as a touchscreen, and may collect a touch operation performed by the user on or near the touch panel 1071 (for example, an operation performed on or near the touch panel 1071 by the user by using any appropriate object or accessory such as a finger or a stylus). The touch panel 1071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 110, and receives and executes a command from the processor 110. In addition, the touch panel 1071 may be implemented in a plurality of forms such as a resistive type, a capacitive type, an infrared ray, and a surface acoustic wave. In addition to the touch panel 1071, the user input unit 107 may further include another input device 1072. Specifically, the another input device 1072 may include but is not limited to a physical keyboard, function keys (for example, a volume control key and an on/off key), a trackball, a mouse, and a joystick. Details are not described herein again.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 9, the touch panel 1071 and the display panel 1061 are used as two independent components to implement input and output functions of the UE, in some embodiments, the touch panel 1071 and the display panel 1061 may be integrated to implement the input and output functions of the UE. This is not specifically limited herein.

The interface unit 108 is an interface for connecting an external apparatus to the UE 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 108 may be configured to receive input (for example, data information and power) from the external apparatus and transmit the received input to one or more elements in the UE 100, or may be configured to transmit data between the UE 100 and the external apparatus.

The memory 109 may be configured to store software programs and various data. The memory 109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 109 may include a high-speed random access memory, and may further include a non-volatile memory such as at least one magnetic disk storage device, a flash memory device, or another volatile solid-state storage device.

The processor 110 is a control center of the UE, connects various parts of the entire UE by using various interfaces and circuits, and performs various functions of the UE and processes data by running or executing software programs and/or modules stored in the memory 109 and invoking data stored in the memory 109, to monitor the UE as a whole. The processor 110 may include one or more processing units. Optionally, an application processor and a modem processor may be integrated into the processor 110. The application processor mainly processes an operating system, a user interface, an application, and the like. The modem processor mainly processes wireless communication. It may be understood that, alternatively, the modem processor may not be integrated into the processor 110.

The UE 100 may further include the power supply 111 (for example, a battery) supplying power to each component. Optionally, the power supply 111 may be logically connected to the processor 110 by using a power management system, so that functions such as charge and discharge management and power consumption management are implemented by using the power management system.

In addition, the UE 100 includes some function modules not shown. Details are not described herein again.

Figure 10:
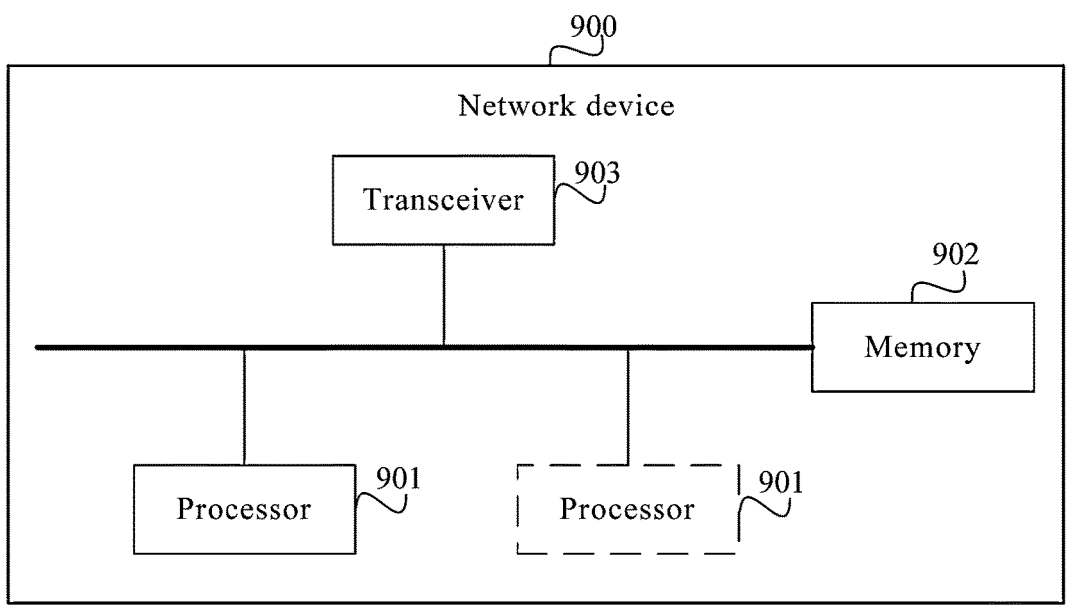
FIG. 10 is a schematic diagram of hardware of a network device according to an embodiment of the present disclosure.

FIG. 10 is a schematic diagram of a hardware structure of a network device according to an embodiment of the present disclosure. The network device 900 includes a processor 901, a memory 902, and a transceiver 903.

In this embodiment of the present disclosure, one or more processors 901, the memory 902, and the transceiver 903 may be connected to each other. One or more processors 901 may be a baseband processing unit, which may also be referred to as an indoor baseband processing unit; and the transceiver may be a remote radio unit (RRU), which may also be referred to as a remote control transmit unit. In addition, the network device 900 may further include some function modules not shown, and details are not described herein again.

The transceiver 903 is configured to send resource configuration information to the UE, where the resource configuration information is used to determine a plurality of candidate starting positions in time domain of a candidate resource, the candidate resource is configured by the network device for transmitting an uplink signal, and the uplink signal includes a demodulation reference signal DMRS, where the plurality of candidate starting positions in time domain are all before a resource used to transmit the DMRS. The uplink signal may be a target uplink signal in the foregoing embodiment.

In addition, the network device 900 further includes some function modules not shown, and details are not described herein again.

Optionally, an embodiment of the present disclosure further provides UE, and the UE may be the UE 20 as shown in FIG. 1. With reference to FIG. 9, the UE may include a processor 110, a memory 109, and a computer program stored in the memory 109 and executable on the processor 110. When the computer program is executed by the processor 110, each process of the embodiments of the foregoing resource configuration method can be implemented, and a same technical effect can be achieved. To avoid repetition, details are not described herein again.

Optionally, an embodiment of the present disclosure further provides a network device, and the network device may be the network device 10 as shown in FIG. 1. With reference to FIG. 10, the network device may include a processor 901, a memory 902, and a computer program stored in the memory 902 and executable on the processor 901. When the computer program is executed by the processor 901, each process of the embodiments of the foregoing resource configuration method can be implemented, and a same technical effect can be achieved. To avoid repetition, details are not described herein again.

An embodiment of the present disclosure further provides a computer-readable storage medium, and the computer-readable storage medium stores a computer program. When the computer program is executed by the processor, each process of the embodiments of the foregoing resource configuration method can be implemented, and a same technical effect can be achieved. To avoid repetition, details are not described herein again. The computer readable storage medium is, for example, a read-only memory (ROM), a random access memory (RAM), a magnetic disk, or an optical disc.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related technologies may be implemented in a form of a software product. The computer software product is stored in a storage medium (for example, a ROM/RAM, a magnetic disk, or a compact disc), and includes a plurality of instructions for instructing user equipment (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

The invention claimed is:

1. A resource configuration method, applied to user equipment UE, wherein the method comprises:
   receiving resource configuration information sent by a network device, wherein the resource configuration information is used to determine a plurality of candidate starting positions in time domain of a candidate resource, the candidate resource is configured by the network device for transmitting an uplink signal, and the uplink signal comprises a demodulation reference signal DMRS, wherein
   the plurality of candidate starting positions in time domain are all before a resource used to transmit the DMRS;
   the resource configuration information comprises: a plurality of pieces of offset position information, and a plurality of pieces of transmission resource information respectively corresponding to the plurality of pieces of offset position information;
   each piece of offset position information in the plurality of pieces of offset position information is used to indicate an offset, and each piece of transmission resource information in the plurality of pieces of transmission resource information is used to indicate a candidate resource; and
   wherein the method further comprises:
   determining the plurality of candidate starting positions in time domain by subtracting an offset indicated by a corresponding one of the plurality of pieces of offset position information from a starting position in time domain of each of the plurality of candidate resources.

2. The method according to claim 1, wherein each of the plurality of candidate starting positions in time domain is any one of the following:
   any time domain position before a sub-time domain unit in which the DMRS is transmitted in a first time domain unit; and
   any time domain position in a second time domain unit, wherein
   the first time domain unit is a time domain unit in which the candidate resource is located, and the second time domain unit is a time domain unit located before the first time domain unit.

3. The method according to claim 1, wherein the plurality of candidate resources have a same resource length and different start time domain positions.

4. The method according to claim 1, wherein after the receiving resource configuration information sent by a network device, the method further comprises:
   starting transmission from a first start time domain position among the plurality of candidate starting positions in time domain based on the resource configuration information.

5. The method according to claim 4, wherein a resource between the first start time domain position and the second start time domain position carries other information except the uplink signal, and the second start time domain position is a time domain position for starting transmitting the uplink signal.

6. The method according to claim 4, wherein the first start time domain position is configured by the network device or selected by the UE.

7. A computer-readable storage medium, wherein the computer-readable storage medium stores a computer program, and when the computer program is executed by a processor, steps of the resource configuration method according to claim 1 is implemented.

8. A resource configuration method, applied to a network device, wherein the method comprises:
   sending resource configuration information to user equipment UE, wherein the resource configuration information is used to determine a plurality of candidate starting positions in time domain of a candidate resource, the candidate resource is configured by the network device for transmitting an uplink signal, and the uplink signal comprises a demodulation reference signal DMRS, wherein the plurality of candidate starting positions in time domain are all before a resource used to transmit the DMRS;
   the resource configuration information comprises: a plurality of pieces of offset position information, and a plurality of pieces of transmission resource information respectively corresponding to the plurality of pieces of offset position information;

each piece of offset position information in the plurality of pieces of offset position information is used to indicate an offset, and each piece of transmission resource information in the plurality of pieces of transmission resource information is used to indicate a candidate resource; and the plurality of candidate starting positions in time domain are determined by subtracting an offset indicated by a corresponding one of the plurality of pieces of offset position information from a starting position in time domain of each of the plurality of candidate resources.

9. The method according to claim 8, wherein each of the plurality of candidate starting positions in time domain is any one of the following:

any time domain position before a sub-time domain unit in which the DMRS is transmitted in a first time domain unit; and any time domain position in a second time domain unit, wherein the first time domain unit is a time domain unit in which the candidate resource is located, and the second time domain unit is a time domain unit located before the first time domain unit.

10. The method according to claim 8, wherein the plurality of candidate resources have a same resource length and different start time domain positions.

11. A network device, wherein the network device comprises a processor, a memory, and a computer program stored in the memory and executable on the processor, and when the computer program is executed by the processor, the steps of the resource configuration method according to claim 8 is implemented.

12. A computer-readable storage medium, wherein the computer-readable storage medium stores a computer program, and when the computer program is executed by a processor, steps of the resource configuration method according to claim 8 is implemented.

13. The method according to claim 8, wherein the method further comprises:

receiving a transmission started from a first start time domain position among the plurality of candidate starting positions in time domain based on the resource configuration information.

14. The method according to claim 13, wherein a resource between the first start time domain position and the second start time domain position carries other information except the uplink signal, and the second start time domain position is a time domain position for starting transmitting the uplink signal.

15. A user equipment UE, wherein the UE comprises a processor, a memory, and a computer program stored in the memory and executable on the processor, wherein the computer program, when executed by the processor, implements:

receiving resource configuration information sent by a network device, wherein the resource configuration information is used to determine a plurality of candidate starting positions in time domain of a candidate resource, the candidate resource is configured by the network device for transmitting an uplink signal, and the uplink signal comprises a demodulation reference signal DMRS, wherein the plurality of candidate starting positions in time domain are all before a resource used to transmit the DMRS;

the resource configuration information comprises: a plurality of pieces of offset position information, and a plurality of pieces of transmission resource information respectively corresponding to the plurality of pieces of offset position information;

each piece of offset position information in the plurality of pieces of offset position information is used to indicate an offset, and each piece of transmission resource information in the plurality of pieces of transmission resource information is used to indicate a candidate resource; and wherein the computer program, when executed by the processor, further implements:

determining the plurality of candidate starting positions in time domain by subtracting an offset indicated by a corresponding one of the plurality of pieces of offset position information from a starting position in time domain of each of the plurality of candidate resources.

16. The UE according to claim 15, wherein each of the plurality of candidate starting positions in time domain is any one of the following:

any time domain position before a sub-time domain unit in which the DMRS is transmitted in a first time domain unit; and any time domain position in a second time domain unit, wherein the first time domain unit is a time domain unit in which the candidate resource is located, and the second time domain unit is a time domain unit located before the first time domain unit.

17. The UE according to claim 15, wherein the plurality of candidate resources have a same resource length and different start time domain positions.

18. The UE according to claim 15, wherein the computer program, when executed by the processor, further implements:

after the receiving resource configuration information sent by a network device, starting transmission from a first start time domain position among the plurality of candidate starting positions in time domain based on the resource configuration information.

19. The UE according to claim 18, wherein a resource between the first start time domain position and the second start time domain position carries other information except the uplink signal, and the second start time domain position is a time domain position for starting transmitting the uplink signal.

20. The UE according to claim 18, wherein the first start time domain position is configured by the network device or selected by the UE.

* * * * *